US012798439B2

(12) United States Patent
Lin et al.

(10) Patent No.: US 12,798,439 B2
(45) Date of Patent: Nov. 17, 2026

(54) BATTERY HEATING CONTROL METHOD AND CONTROL DEVICE

(71) Applicant: CONTEMPORARY AMPEREX TECHNOLOGY (HONG KONG) LIMITED, Hong Kong (CN)

(72) Inventors: Longzhen Lin, Ningde (CN); Xiao Wang, Ningde (CN); Diping Liu, Ningde (CN); Zhanliang Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/954,266

(22) Filed: Nov. 20, 2024

(65) Prior Publication Data

US 2025/0083567 A1 Mar. 13, 2025

Related U.S. Application Data

(63) Continuation of application No. PCT/CN2022/128752, filed on Oct. 31, 2022.

(51) Int. Cl.
*B60L 58/24* (2019.01)
*B60L 53/64* (2019.01)
(Continued)

(52) U.S. Cl.
CPC ............... *B60L 58/24* (2019.02); *B60L 53/64* (2019.02); *B60L 58/18* (2019.02); *G06Q 50/06* (2013.01);
(Continued)

(58) Field of Classification Search
None
See application file for complete search history.

(56) References Cited

U.S. PATENT DOCUMENTS 11,495,839 B2 * 11/2022 Beuning ............ H01M 10/441
2014/0285135 A1 * 9/2014 Ji ............................ B60L 1/02
320/129
(Continued)

FOREIGN PATENT DOCUMENTS

CN 106608195 A 5/2017
CN 112224092 A 1/2021
(Continued)

OTHER PUBLICATIONS

International Search Report for International application No. PCT/CN2022/128752 filed Oct. 31, 2022, Mail Date: Jul. 4, 2023, English + Original Document, 5 pages.
(Continued)

*Primary Examiner* — Regis J Betsch
*Assistant Examiner* — Joel Barnett
(74) *Attorney, Agent, or Firm* — K&L Gates LLP

(57) ABSTRACT

A control method or device for performing the method is described. A first battery in the battery heating system needs to be heated. The first battery is controlled to conduct charging and discharging to heat the first battery, where the first battery is discharged to a second battery in the battery heating system so that the first battery is heated by heat generated during the process of discharging the first battery to the second battery and charging the first battery, thereby saving energy for battery heating and reducing the battery heating cost.

14 Claims, 4 Drawing Sheets

(51) Int. Cl.

| | |
|---|---|
| ***B60L 58/18*** | (2019.01) |
| ***G06Q 50/06*** | (2024.01) |
| ***H01M 10/615*** | (2014.01) |
| ***H01M 10/625*** | (2014.01) |
| ***H01M 10/633*** | (2014.01) |
| ***H01M 10/637*** | (2014.01) |
| ***H02J 3/32*** | (2026.01) |

(52) U.S. Cl.

CPC ....... *H01M 10/615* (2015.04); *H01M 10/625* (2015.04); *H01M 10/633* (2015.04); *H01M 10/637* (2015.04); *H02J 3/32* (2013.01); *H01M 2220/20* (2013.01)

(56) References Cited

U.S. PATENT DOCUMENTS

2016/0226268 A1* 8/2016 Okui .......................... H02J 7/56
2020/0130535 A1* 4/2020 Robert .............. H02J 7/007194
2020/0212512 A1 7/2020 Kwon
2020/0381928 A1* 12/2020 Isaksson ............. H01M 10/658
2022/0203863 A1* 6/2022 Wu .................... G01R 31/3648
2022/0263144 A1* 8/2022 Xie ..................... H01M 10/425

FOREIGN PATENT DOCUMENTS

| | | | |
|---|---|---|---|
| CN | 214254532 | U | 9/2021 |
| CN | 115133177 | A | 9/2022 |
| DE | 102021005316 | A1 | 12/2021 |
| EP | 3787097 | A1 | 3/2021 |

OTHER PUBLICATIONS

The extended European search report received in the counterpart European Application No. 22963765.7, mailed Jul. 25, 2025, 10 pages.

* cited by examiner

BATTERY HEATING CONTROL METHOD AND CONTROL DEVICE

RELATED FIELD

This application is a continuation of International Application No. PCT/CN2022/128752, filed on Oct. 31, 2022, which is incorporated herein by reference in its entirety.

TECHNICAL FIELD

The present application relates to the technical field of batteries, and particularly relates to a battery heating control method and a control device.

BACKGROUND

With the advantages such as high energy density, cyclic charging, security and environmental protection, batteries are widely applied to the fields such as new energy vehicles, consumer electronics and energy storage systems.

However, the use of the batteries can be limited in a low-temperature environment. For example, the discharge capacity of the batteries can be severely degraded in a low-temperature environment, and the batteries cannot be charged in a low-temperature environment, thereby affecting user experience. Thus, the batteries need to be heated in a low-temperature environment. At present, an additional heating assembly is usually arranged in the battery to heat the battery. This heating method increases energy consumption for battery heating, thereby increasing the battery heating cost.

SUMMARY

Embodiments of the present application provide a battery heating control method and a control device, through which power consumption for battery heating and the heating cost of batteries can be reduced.

A first aspect provides a battery heating control method. The control method is applied to a battery heating system including a plurality of batteries connected with each other. The control method includes: determining that a first battery in the battery heating system needs to be heated; and controlling the first battery to conduct charging and discharging to heat the first battery, where the first battery is discharged to a second battery in the battery heating system.

According to a battery heating control scheme provided in the embodiment of the present application, the first battery can be controlled to be discharged to the second battery in the case that the first battery needs to be heated so that the first battery is heated by heat generated during the process of discharging the first battery to the second battery and charging the first battery, thereby being capable of saving energy for battery heating and reducing the battery heating cost.

In an embodiment, where the controlling the first battery to conduct charging and discharging, includes: controlling the first battery and the second battery to conduct charging and discharging with each other to heat the first battery and the second battery in the case that the second battery needs to be heated.

According to the battery heating control scheme provided in the embodiment of the present application, the first battery and the second battery can be controlled to conduct charging and discharging with each other in the case that both the first battery and the second battery need to be heated so that the first battery and the second battery can be heated simultaneously by heat generated during the process of charging and discharging of the first battery and charging and discharging of the second battery, thereby being capable of improving the battery heating efficiency and saving energy required for battery heating. On the other hand, according to the battery heating control scheme, there is little need to add an additional heating assembly and the like to the battery, and thus the battery heating cost can be reduced.

In an embodiment, where the controlling the first battery to conduct charging and discharging, includes: controlling a dischargeable third battery to charge the first battery in the case that the third battery exists in the battery heating system and the second battery does not need to be heated.

According to the battery heating control scheme provided in the embodiment of the present application, in the case that the dischargeable third battery exists in the battery heating system and the second battery does not need to be heated, heating the first battery and charging the second battery are implemented simultaneously through charging the first battery by the third battery and discharging the first battery to the second battery, economic factors of battery charging and battery heating are considered, energy for battery heating can be saved, and the battery heating efficiency can be improved. On the other hand, according to the battery heating control scheme provided in the embodiment of the present application, there is little need to add an additional heating assembly and the like to the battery, and thus the battery heating cost can be reduced.

In an embodiment, where the battery heating system is connected to a power grid and/or an energy generation system, and the controlling the first battery to conduct charging and discharging, includes: controlling the power grid and/or the energy generation system to charge the first battery in the case that the second battery does not need to be heated.

According to the battery heating control scheme provided in the embodiment of the present application, in the case that the battery heating system is connected to the power grid and/or the energy generation system, the power grid and/or the energy generation system can be controlled to charge the first battery, and the first battery can be controlled to be discharged to the second battery. The second battery can be charged while the first battery is heated. Economic factors of battery charging and battery heating are considered, energy for battery heating can be saved, and the battery heating efficiency can be improved. On the other hand, according to the battery heating control scheme, there is little need to add an additional heating assembly and the like to the battery, and thus the battery heating cost can be reduced.

In an embodiment, the controlling the power grid and/or the energy generation system to charge the first battery includes: controlling the power grid and/or the energy generation system to charge the first battery in the case that the power grid is at a valley period electricity price and/or residual output energy exists in the energy generation system.

According to the battery heating control scheme provided in the embodiment of the present application, in the case that the power grid is at a valley period electricity price and/or residual energy exists in the energy generation system, the power grid and/or the energy generation system is controlled to charge the first battery, and economic factors of battery heating are considered, and the battery heating cost can be reduced.

In an embodiment, the power grid and/or the energy generation system is controlled to charge the first battery in the case that a dischargeable third battery exists in the battery heating system, the power grid is at a valley period electricity price and/or residual output energy exists in the energy generation system and the second battery does not need to be heated.

According to the battery heating control scheme provided in the embodiment of the present application, in the case that the power grid is at a valley period electricity price and/or residual output energy exists in the energy generation system and the second battery does not need to be heated, the power grid and/or the energy generation system can be controlled to charge the first battery, the first battery is controlled to be discharged to the second battery, economic factors of battery heating are considered, and the battery heating cost is reduced. On the other hand, according to the battery heating control scheme, by controlling to reduce the number of charging cycles of the first battery by the power grid and/or the energy generation system and discharging cycles of the first battery to the second battery, the number of charging and discharging times can be reduced to some extent, the performance of the third battery can be improved, and the service life of the third battery can be prolonged.

In an embodiment, the battery heating system is connected to the power grid and/or the energy generation system, and the controlling the first battery to conduct charging and discharging includes: controlling a dischargeable third battery to charge the first battery in the case that the dischargeable third battery exists in the battery heating system, the power grid is at a peak-valley electricity price and/or no residual output energy exists in the energy generation system and the second battery does not need to be heated.

According to the battery heating control scheme provided in the embodiment of the present application, in the case that the power grid is at a peak-valley electricity price and/or no residual output energy exists in the energy generation system and the second battery does not need to be heated, the third battery can be controlled to charge the first battery, the first battery is controlled to be discharged to the second battery, economic factors of battery heating are considered, and the battery heating cost can be reduced.

In an embodiment, the first battery is a traction battery or an energy storage battery, and the second battery is a traction battery or an energy storage battery.

According to the battery heating control scheme provided in the embodiment of the present application, batteries to be heated can be heated by heat generated during the process of charging and discharging of the batteries in an energy storage charging station, economic factors are considered in the process of heating the batteries, energy for battery heating is saved, the battery heating cost is reduced, and the yield of the energy storage charging station is increased.

In an embodiment, both the first battery and the second battery are traction batteries, and the third battery is an energy storage battery.

According to the battery heating control scheme provided in the embodiment of the present application, a first traction battery can be heated and a second traction battery can be charged simultaneously by charging the first traction battery (the first battery) through the energy storage battery and discharging the first traction battery to the second traction battery, energy for battery heating can be saved, and the battery heating cost can be reduced.

A second aspect provides a battery heating control device. The control device is applied to a battery heating system including a plurality of batteries connected with each other. The control device includes a determination unit for determining that a first battery in the battery heating system needs to be heated; and a control unit for controlling the first battery to conduct charging and discharging to heat the first battery, wherein the first battery is discharged to a second battery in the battery heating system.

In an embodiment, the control unit is configured to control the first battery and the second battery to conduct charging and discharging with each other to heat the first battery and the second battery in the case that the second battery needs to be heated.

In an embodiment, the control unit is configured to control a dischargeable third battery to charge the first battery in the case that the dischargeable third battery exists in the battery heating system and the second battery does not need to be heated.

In an embodiment, the battery heating system is connected to a power grid and/or an energy generation system, and the control unit is configured to control the power grid and/or the energy generation system to charge the first battery in the case that the second battery does not need to be heated.

In an embodiment, the control unit is configured to control the power grid and/or the energy generation system to charge the first battery in the case that the power grid is at a valley period electricity price and/or residual output energy exists in the energy generation system.

In an embodiment, the power grid and/or the energy generation system is controlled to charge the first battery in the case that a dischargeable third battery exists in the battery heating system, the power grid is at a valley period electricity price and/or residual output energy exists in the energy generation system and the second battery does not need to be heated.

In an embodiment, the battery heating system is connected to the power grid and/or the energy generation system, and the control unit is configured to control a dischargeable third battery to charge the first battery in the case that the dischargeable third battery exists in the battery heating system, the power grid is at a peak-valley electricity price and/or no residual output energy exists in the energy generation system.

In an embodiment, the first battery is a traction battery or an energy storage battery, and the second battery is a traction battery or an energy storage battery.

In an embodiment, both the first battery and the second battery are traction batteries, and the third battery is an energy storage battery.

A third aspect provides a battery heating system, including a plurality of batteries connected with each other and the control device in the second aspect and any one of the possible implementations in the second aspect above.

A fourth aspect provides a battery heating control device. The control device includes a memory and a processor. The memory is used to store instructions. The processor is used to read the instructions and perform the method in the first aspect and any one of the possible implementations in the first aspect according to the instructions.

A fifth aspect provides a chip, including a processor for calling a computer program from the memory and running the computer program to enable a device provided with the chip to perform the method in the first aspect and any one of the possible implementations in the first aspect.

A sixth aspect provides a computer program, wherein the computer program is executed to enable a computer to implement the method in the first aspect and any one of the possible implementations in the first aspect.

A seventh aspect provides a computer-readable storage medium for storing a computer program. The computer program is executed by a computer to enable the computer to implement the method in the first aspect and any one of the possible implementations in the first aspect.

An eighth aspect provides a computer program product including a computer program instruction. The computer program instruction is executed by a computer to enable the computer to implement the method in the first aspect and any one of the possible implementations in the first aspect.

DESCRIPTION OF THE DRAWINGS

To more clearly illustrate the technical solutions of the embodiments of the present application, the accompanying drawings required by the embodiments of the present application are introduced briefly below. Apparently, the accompanying drawings depicted below are merely some examples of the present application, for those skilled in the art, they can also obtain other accompanying drawings based on the accompanying drawings without paying creative work.

DESCRIPTION OF EMBODIMENTS

Figure 1:
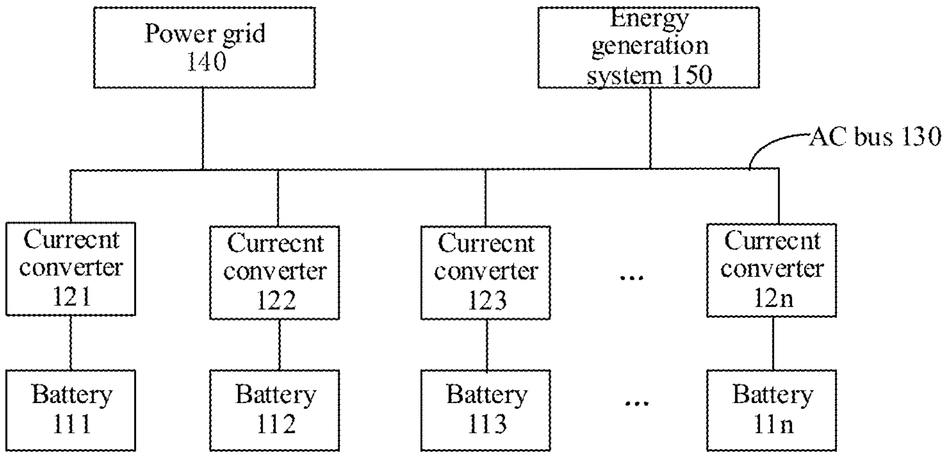
FIG. 1 is a structural schematic diagram of a battery heating system provided according to the embodiment of the present application.

Implementations of the present application are described in further detail below in conjunction with the accompanying drawings and embodiments. The following detailed description of the embodiments and the accompanying drawings are used to illustrate the principles of the present application but are not intended to limit the scope of the present application, i.e., the present application is not limited to the described embodiments.

Unless otherwise defined, all technical and scientific terms used in the present application have the same meaning as commonly understood by those skilled in the art to which the present application pertains. The terms used in the description of the present application are to describe specific embodiments only and are not intended to limit the present application. The terms "including" and "having" and any variations thereof in the specification and claims of the present application and the above brief description of the accompanying drawings are intended to cover a non-exclusive inclusion. The terms "first", "second", and so on in the description and claims or accompanying drawings of the present application are intended to distinguish different objects, but not to describe particular sequences or primary-secondary relationships.

The term "and/or" is simply a description of the association relationship of the associated objects, indicating that three relationships can exist, for example, A and/or B, which can mean: A exists alone, both A and B exist, and B exists alone. In addition, the character "/" in the present application generally indicates an alternative relationship between the front and back associated objects.

In the description of the present application, it should also be noted that, unless otherwise expressly specified and limited, the terms "connected" and "attached" should be understood in a broad sense, for example, it can be "directly connected" or "indirectly connected through an intermediate medium". The specific meanings of the above terms in the present application may be understood by those of ordinary skill in the art depending on specific circumstances.

The "embodiment" mentioned in the present application means that special features, structures, or characteristics are described in conjunction with the embodiments and may be included in at least one embodiment of the present application. The phrase appearing at each position of the description does not necessarily indicate the same embodiment and it is not an exclusively independent or alternative embodiment of other embodiments. It is explicitly and implicitly understood by those skilled in the art that the embodiments described herein may be combined with other embodiments.

With the advantages such as high energy density, cyclic charging, security and environmental protection, batteries are widely applied to the fields such as new energy vehicles, consumer electronics and energy storage systems.

However, the use of the batteries can be limited in a low-temperature environment. For example, the discharge capacity of the batteries can be severely degraded in a low-temperature environment, and the batteries cannot be charged in a low-temperature environment, thereby affecting user experience. Thus, the batteries need to be heated in a low-temperature environment. At present, an additional heating element is usually arranged in a battery to heat the battery. According to the heating method, the energy required for battery heating is large, thereby increasing the battery heating cost.

In view of this, the embodiments of the present application provide a battery heating control method, which is applied to a battery heating system including a plurality of batteries connected with each other. A first battery in the battery heating system can be determined to need to be heated; the first battery is controlled to conduct charging and discharging to heat the first battery, wherein the first battery is discharged to a second battery in the battery heating system.

According to a battery heating control scheme provided in the embodiment of the present application, the first battery can be controlled to be discharged to the second battery in the case that the first battery needs to be heated so that the first battery is heated by heat generated during the process of discharging the first battery to the second battery and charging the first battery, thereby being capable of saving energy for battery heating and reducing the battery heating cost.

FIG. 1 is a structural diagram of a battery heating system applicable to the embodiment of the present application.

The battery heating system may include a plurality of batteries: battery 111, battery 112, battery 113, . . . , and battery **11*n*** which are connected with each other.

In an embodiment of the present application, the battery heating system may include a plurality of current converters, for example, bidirectional direct current/alternating current (DC/AC) converters: current converter 121, current converter 122, current converter 123, . . . , and current converter **12*n*, the plurality of batteries can be connected to one end of a plurality of current converters, and the other ends of the plurality of current converters can be connected with each other. For example, the battery 111 can be connected with one end of the current converter 121, the battery 112 can be connected with one end of the current converter 121, . . . , the battery 11*n* can be connected to one end of the current converter 12*n*. The other ends of the current converter 121, the current converter 122, the current converter 123, . . . , and the current converter 12*n*** are connected with each other, thereby being capable of realizing interconnection of the plurality of batteries.

In an embodiment of the present application, the other ends of the plurality of current converters can be connected to an AC bus 130. Interconnection of the plurality of batteries can be realized through the connection of the plurality of the current converters and the AC bus 130.

In an embodiment of the present application, the plurality of batteries may include energy storage batteries and/or traction batteries.

In an embodiment of the present application, the plurality of batteries may be batteries in an energy storage charging system such as a charging station.

In an embodiment of the present application, the battery heating system can be connected to a power grid 140. For example, the power grid 140 can be connected to the AC bus 130 to realize the connection of the plurality of batteries and the power grid 140.

In an embodiment of the present application, the power grid 140 can be connected to the AC bus 130 through a grid side current converter. One end of the grid side current converter is connected to the power grid 140, and the other end of the grid side current converter is connected to the AC bus 130.

In an embodiment of the present application, the battery heating system can be connected to an energy generation system 150. For example, the energy generation system 150 can be connected to the AC bus 130 to realize the connection of the plurality of batteries and the energy generation system.

In an embodiment of the present application, the energy generation system 150 can be connected to the AC bus 130 through an energy generation system side current converter. One end of the energy generation system side current converter is connected to the energy generation system 150, and the other end of the energy generation system side current converter is connected to the AC bus 130.

In an embodiment of the present application, the energy generation system 150 may be one or more of a thermal power generation system, a hydraulic power generation system or a new energy power generation system.

In an embodiment of the present application, the power grid 140 can be connected to the energy generation system 150.

In an embodiment of the present application, a battery A and a battery B can conduct charging and discharging with each other to heat the battery A and the battery B through heat generated during charging and discharging. For example, the battery 111 and the battery 112 can conduct charging and discharging with each other.

In an embodiment of the present application, the battery A can charge the battery B, and the battery B can be discharged to a battery C, thereby being capable of heating the battery B. For example, the battery 111 can charge the battery 112, and the battery 112 can be discharged to the battery 113.

In an embodiment of the present application, the power grid 140 can charge the battery A, and the battery A can be discharged to the battery B, thereby being capable of heating the battery A. For example, the power grid 140 can charge the battery 111, and the battery 111 can be discharged to the battery 112.

In an embodiment of the present application, the energy generation system 150 can charge the battery A, and the battery A can be discharged to the battery B, thereby being capable of heating the battery A. For example, the energy generation system 150 can charge the battery 111, and the battery 111 can be discharged to the battery 112.

In an embodiment of the present application, the plurality of batteries may be a plurality of traction batteries in a vehicle such as an electric car. For example, in the case that the plurality of batteries are the plurality of traction batteries in the vehicle such as the electric car, the power grid 140 can be replaced with a motor or an energy storage element and the like in the vehicle, and the current converters **121-12*n*** can be replaced with power devices and the like in the vehicle.

Figure 2:
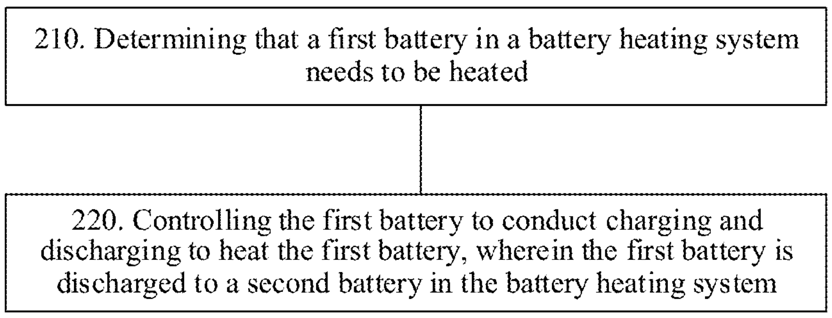
FIG. 2 is a schematic flow diagram of a battery heating control method provided according to the embodiment of the present application.

FIG. 2 is a schematic flow diagram of the battery heating control method provided according to the embodiment of the present application. The battery heating control method is applicable to the battery heating system including the plurality of batteries connected with each other as shown in FIG. 1.

At operation 210, the method includes to determine that a first battery in the battery heating system needs to be heated.

In an embodiment of the present application, it can be determined that the first battery needs to be heated according to a received battery heating request of the first battery. For example, a battery management system (BMS) in the first battery can monitor battery information of the battery such as the temperature of the battery. When the temperature of the first battery is lower than or equal to a preset temperature, the first battery can send a battery heating request to a controller in the battery management system. The controller in the battery heating system can determine that the first battery in the battery heating system needs to be heated according to the received battery heating request.

In an embodiment of the present application, it can be determined that the first battery needs to be heated according to the received temperature of the first battery. For example, the BMS in the battery can monitor temperature information of the battery in real time and send the temperature information to the controller in the battery heating system. In the case that the temperature of the first battery is less than or equal to the preset temperature (e.g., a threshold), the controller in the battery heating system can determine that the first battery needs to be heated according to the received real-time temperature information of the first battery.

In an embodiment of the present application, during the process of normal charging or normal discharging of the first battery, when the temperature of the first battery is lowered to be less than or equal to the preset temperature, the first battery needs to be heated.

In an embodiment of the present application, when the first battery does not conduct charging and discharging and the temperature of the first battery is lowered to be less than or equal to the preset temperature, the first battery needs to be heated. For example, in the case that charging of the first battery is completed and an electric apparatus does not use the first battery, when the temperature of the first battery is less than or equal to the preset temperature, it can be determined that the first battery needs to be heated.

In an embodiment of the present application, when the first battery does not conduct charging and discharging and the temperature of the first battery is lowered to be less than or equal to the preset temperature, if the electric apparatus does not need to use the first battery (the electric apparatus does not need normal discharging of the first battery), the first battery temporarily does not need to be heated. In the case that the first battery does not conduct charging and discharging and the temperature of the first battery is lowered to be less than or equal to the preset temperature, when the electric apparatus needs to use the first battery (the electric apparatus needs normal charging of the first battery), the first battery needs to be heated. For example, in the case that the electric apparatus completes charging and the temperature of the first battery is lowered to be less than or equal to the preset temperature, if the electric apparatus needs to use electricity of the first battery at some moment, it can be determined at the moment that the first battery needs to be heated.

It should be understood that normal charging or normal discharging of the first battery in the embodiment of the present application refers to continuous charging or continuous discharging of the first battery above the preset temperature. In the embodiment of the present application, the controlling the first battery to conduct charging and discharging to heat the first battery refers to transitory charging and transitory discharging when the temperature of the first battery is less than or equal to the preset temperature, for example, pulse cyclic charging and discharging.

At operation 220, the method includes to control the first battery to conduct charging and discharging to heat the first battery.

The first battery is discharged to the second battery in the battery heating system.

In an embodiment of the present application, when the first battery is controlled to conduct charging and discharging, the first battery can be controlled to conduct charging and then to be discharged to the second battery, or the first battery can be controlled to be discharged to the second battery and then to conduct charging.

According to a battery heating control scheme provided in the embodiment of the present application, the first battery can be controlled to be discharged to the second battery in the case that the first battery needs to be heated so that the first battery is heated by heat generated during the process of discharging the first battery to the second battery and charging the first battery, thereby being capable of saving energy for battery heating and reducing the battery heating cost.

Figure 3:
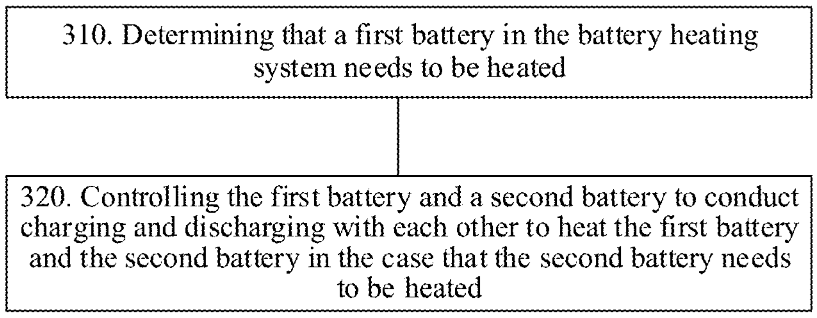
FIG. 3 is another schematic flow diagram of the battery heating control method provided according to the embodiment of the present application.

FIG. 3 is another schematic flow diagram of the battery heating control method provided according to the embodiment of the present application. The battery heating control method is applicable to a battery heating system including a plurality of batteries connected with each other.

At operation 310, the method includes to determine that a first battery in the battery heating system needs to be heated.

The description in operation 310 can refer to the related description in operation 210, which will not be described here according to the present application.

At operation 320, the method may control the first battery and a second battery to conduct charging and discharging with each other to heat the first battery and the second battery in the case that the second battery needs to be heated.

In an embodiment of the present application, the second battery may be a battery which needs to be heated with the first battery simultaneously. The second battery may also be a battery which already needs to be heated before the first battery needs to be heated and still needs to be heated when the first battery needs to be heated.

In an embodiment of the present application, it can be determined that the second battery needs to be heated according to a battery heating request sent by the second battery.

In an embodiment of the present application, it can be determined that the second battery needs to be heated according to temperature information of the second battery sent by the second battery.

In an embodiment of the present application, either one battery that needs to be heated and another battery that needs to be heated are connected to conduct charging and discharging with each other, or one battery that needs to be heated and multiple batteries that need to be heated to conduct charging and discharging with each other, or multiple batteries that need to be heated and the multiple batteries that need to be heated conduct charging and discharging with each other.

For example, a battery 1, a battery 2, a battery 3 and a battery 4 in the battery heating system need to be heated, the battery 1 and the battery 2 can be controlled to conduct charging and discharging with each other, and the battery 3 and the battery 4 are controlled to conduct charging and discharging with each other; or the battery 1 is controlled to be discharged to the battery 2, the battery 3 and the battery 4, and then the battery 2, the battery 3 and the battery 4 are controlled to charge the battery 1; or the battery 1 and the battery 2 are controlled to be discharged to the battery 3 and the battery 4, and then the battery 3 and the battery 4 are controlled to conduct charging on the battery 1 and the battery 2.

According to the battery heating control scheme provided in the embodiment of the present application, the first battery and the second battery can be controlled to conduct charging and discharging with each other in the case that both the first battery and the second battery need to be heated so that the first battery and the second battery can be heated simultaneously by heat generated during the process of charging and discharging of the first battery and charging and discharging of the second battery, thereby being capable of saving energy required for battery heating, reducing the battery heating cost and improving the battery heating efficiency. On the other hand, according to the battery heating control scheme provided in the embodiment of the present application, there is little need to add an additional heating assembly and the like to the battery, and thus the battery heating cost can be reduced.

Figure 4:
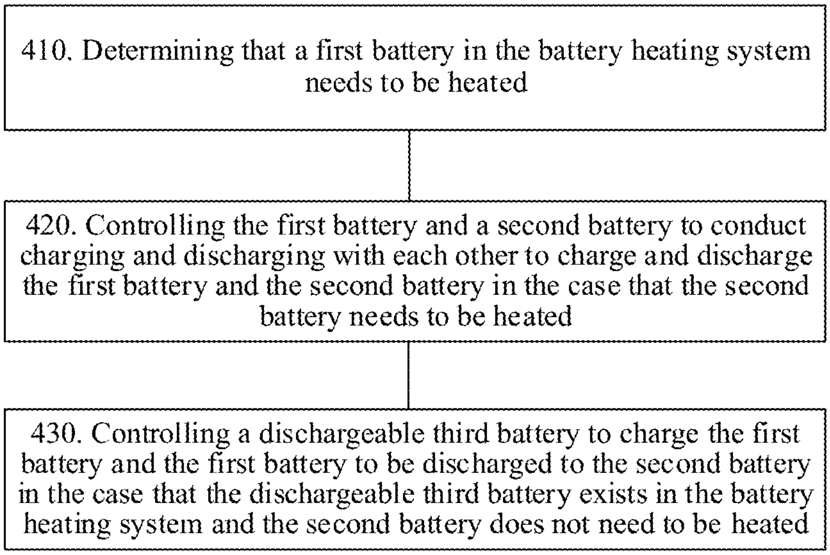
FIG. 4 is another schematic flow diagram of the battery heating control method provided according to the embodiment of the present application.

FIG. 4 is a schematic flow diagram of the battery heating control method provided according to the embodiment of the present application. The battery heating control method is applicable to a battery heating system including a plurality of batteries connected with each other. In an embodiment, the battery heating system may further include a dischargeable third battery. The battery heating control method may include a portion of or all of the following content.

At operation 410, the method includes to determine that a first battery in the battery heating system needs to be heated.

The description in operation 410 can refer to the related description in operation 210, which will not be described here according to the present application.

At operation 420, the method includes to control the first battery and a second battery to conduct charging and discharging with each other to heat the first battery and the second battery in the case that the second battery needs to be heated.

The description in operation 420 can refer to the related description in operation 320, which will not be described here according to the present application.

At operation 430, the method includes to control the first battery to be discharged to the second battery and control a dischargeable third battery to charge the first battery in the case that the dischargeable third battery exists in the battery heating system and the second battery does not need to be heated.

In an embodiment of the present application, the number of the first battery, the second battery or the third battery may be one or more.

For example, a battery 1 that needs to be heated, a battery 2 that does not need to be heated and a dischargeable battery 3 exist in the battery heating system, the battery 3 can be controlled to charge the battery 1, and the battery 1 is controlled to be discharged to the battery 2. For example, a battery 1 and a battery 2 that need to be heated and a battery 3 that does not need to be heated and a dischargeable battery 4 exist in the battery heating system, the battery 4 can be controlled to charge the battery 1 and the battery 2, and then the battery 1 and the battery 2 are controlled to be discharged to the battery 3. For example, a battery 1, a battery 2, a battery 3 and a battery 4 that need to be heated, a battery 5 and a battery 6 that do not need to be heated and a dischargeable battery 7 exist in the battery heating system, the battery 7 can be controlled to charge the battery 1, the battery 2, the battery 3 and the battery 4, and then the battery 1, the battery 2, the battery 3 and the battery 4 are controlled to be discharged to the battery 5 and the battery 6; or the battery 1 and the battery 2 are controlled to conduct charging and discharging with each other, the battery 7 is controlled to be discharged to the battery 3 and the battery 4, and then the battery 3 and the battery 4 are controlled to be discharged to the battery 5 and the battery 6.

In an embodiment of the present application, the second battery can be a battery in the battery heating system that needs to be charged. For example, the battery in the battery heating system of which SOC is less than or equal to $SOC_{charging\ threshold}$ and the temperature is greater than or equal to the preset temperature may be a battery that needs to be charged.

In an embodiment of the present application, it can be determined that the second battery needs to be charged according to a charging request of the second battery. For example, when the SOC of the second battery is less than or equal to $SOC_{charging\ threshold}$ and the temperature of the second battery is greater than or equal to the preset temperature, the second battery can send a charging request to the controller of the battery heating system.

In an embodiment of the present application, it can be determined that the second battery needs to be charged according to the information of the second battery such as SOC and temperature. For example, the BMS of the second battery can send information of the second battery such as SOC and temperature to the controller in the battery heating system. When the SOC of the second battery is less than or equal to $SOC_{charging\ threshold}$ and the temperature of the second battery is greater than or equal to the preset temperature, the controller in the battery heating system can determine that the second battery needs to be charged.

In an embodiment of the present application, the $SOC_{charging\ threshold}$ of different batteries can be determined according to service demands and performance of the batteries. The $SOC_{charging\ threshold}$ of different batteries can be the same or different. For example, the $SOC_{charging\ threshold}$ of an energy storage battery can be set larger, and the $SOC_{charging\ threshold}$ of a traction battery can be set smaller.

In an embodiment of the present application, the second battery may be a battery in the battery heating system that does not need to be charged and heated.

As an example, the second battery may be a battery in a heating system of which SOC satisfies: $SOC_{charging\ threshold}<SOC<SOC_{max}$ and the temperature is greater than or equal to the preset temperature, for example, an energy storage battery in the battery heating system of which SOC satisfies: $SOC_{charging\ threshold}<SOC<SOC_{max}$ and the temperature is greater than or equal to the preset temperature. The second battery does not need to be charged, and the second battery can be charged.

As an example, the second battery may be a battery in the heating system in which charging is completed, SOC satisfies: $SOC_{charging\ threshold}<SOC_{restart\ charging\ threshold}\leq SOC<SOC_{max}$ and the temperature is greater than or equal to the preset temperature. For example, When the SOC of the second battery is less than or equal to $SOC_{charging\ threshold}$ and the temperature of the second battery is greater than or equal to the preset temperature, the second battery needs to be charged. The second battery is placed for a period of time after being charged to $SOC_{max}$ (fully charged or charging completed), and the SOC of the second battery decrease. When the SOC of the second battery decreases to $SOC_{restart\ charging\ threshold}\leq SOC<SOC_{max}$, the second battery does not need to be charged and is rechargeable; and when the SOC of the second battery decreases to $SOC_{restart\ charging\ threshold}$ and the temperature of the second battery is greater than or equal to the preset temperature, the second battery needs to be recharged.

In other words, in the case that the second battery does not need to be heated and charged, the second battery has no charging demand. If there is energy to be input, the second battery can still receive the energy.

In an embodiment of the present application, the SOC of the dischargeable third battery is greater than or equal to $SOC_{discharging\ threshold}$. For example, the third battery may be an energy storage battery of which SOC is greater than or equal to $SOC_{discharging\ threshold}$.

In an embodiment of the present application, the temperature of the dischargeable third battery is greater than or equal to the preset temperature.

According to the battery heating control scheme provided in the embodiment of the present application, in the case that the dischargeable third battery exists in the battery heating system and the second battery does not need to be heated, the first battery and the second battery can be charged simultaneously by charging the first battery by the third battery and discharging the first battery to the second battery, economic factors of battery charging are considered, energy for battery heating can be saved, and the battery heating efficiency can be improved. On the other hand, according to the battery heating control scheme provided in the embodiment of the present application, there is little need to add an additional heating assembly and the like to the battery, and thus the battery heating cost can be reduced.

Figure 5:
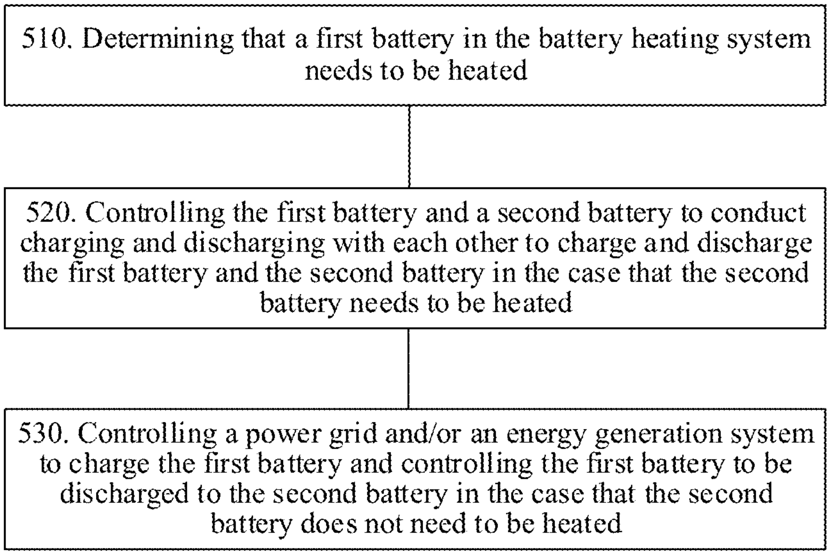
FIG. 5 is another schematic flow diagram of the battery heating control method provided according to the embodiment of the present application.

FIG. 5 is a schematic flow diagram of the battery heating control method provided according to the embodiment of the present application. The battery heating control method is applicable to a battery heating system including a plurality of batteries connected with each other. Optionally, the battery heating system can be connected to an energy generation system/or a power grid. The battery heating control method may include a portion of or all of the following content.

At operation 510, the method includes to determine that a first battery in the battery heating system needs to be heated.

The description in operation 510 can refer to the related description in operation 210, which will not be described here according to the present application.

At operation 520, the method includes to control the first battery and the second battery to conduct charging and discharging with each other to conduct charging and discharging on the first battery and the second battery in the case that the second battery needs to be heated.

The description in operation 520 can refer to the related description in operation 320, which will not be described here according to the present application.

At operation 530, the method includes to control the power grid and/or the energy generation system to charge the first battery and control the first battery to be discharged to the second battery in the case that the second battery does not need to be heated.

In an embodiment of the present application, the number of the first battery or the second battery may be one or more.

For example, a battery system includes a battery 1 that needs to be heated and a battery 2 that does not need to be heated and can control the power grid and/or the energy generation system to charge the battery 1 and control the battery 1 to be discharged to the battery 2.

For example, a battery system includes a battery 1 and a battery 2 that need to be heated and a battery 3 and a battery 4 that do not need to be heated, can control the power grid and/or the energy generation system to charge the battery 1 and the battery 2 and control the battery 1 and the battery 2 to be discharged to the battery 3 and the battery 4, and can also control the power grid and/or the energy generation system to charge the battery 1 and the battery 2, control the battery 1 to be discharged to the battery 3 and control the battery 2 to be discharged to the battery 4.

For example, a battery system includes a battery 1, a battery 2, a battery 3 and a battery 4 that need to be heated and a battery 5 and a battery 6 that do not need to be heated, can control the battery 1 and the battery 2 to conduct charging and discharging with each other, control the power grid and/or the energy generation system to charge the battery 3 and the battery 4, and then control the battery 3 and the battery 4 to be discharged to the battery 5 and the battery 6, and can also control the power grid and/or the energy generation system to charge the battery 1, the battery 2, the battery 3 and the battery 4 and control the battery 1, the battery 2, the battery 3 and the battery 4 to be discharged to the battery 5 and the battery 6.

In an embodiment of the present application, the second battery can be a battery in the battery heating system that needs to be charged. For example, the battery in the battery heating system of which SOC is less than or equal to $SOC_{charging\ threshold}$ and the temperature is greater than or equal to the preset temperature may be a battery that needs to be charged.

In an embodiment of the present application, the second battery may be a battery in the battery heating system that does not need to be charged and heated.

In an embodiment of the present application, the battery heating system can be only connected to a power grid and can control the power grid to charge the first battery and control the first battery to be discharged to the second battery.

In an embodiment of the present application, the battery heating system can be only connected to an energy generation system and can control the energy generation system to charge the first battery and control the first battery to be discharged to the second battery.

In an embodiment of the present application, the battery heating system can be connected to the power grid and the energy generation system and can control the power grid and the energy generation system to charge the first battery and control the first battery to be discharged to the second battery.

In an embodiment of the present application, in the case that the power grid is at a valley period electricity price and/or residual output energy exists in the energy generation system, the power grid and/or the energy generation system is controlled to charge the first battery, and the first battery is controlled to be discharged to the second battery.

In an embodiment of the present application, the battery heating system can be only connected to the power grid and can control the power grid to charge the first battery and control the first battery to be discharged to the second battery in the case that the power grid is at the valley period electricity price.

In an embodiment of the present application, the battery heating system can be only connected to the energy generation system and can control the energy generation system to charge the first battery and control the first battery to be discharged to the second battery in the case that residual energy exists in the energy generation system, such as residual output energy left after the energy generation system outputs energy to the power grid and the like.

In an embodiment of the present application, the battery heating system can be connected to the power grid and the energy generation system, can control the power grid and the energy generation system to charge the first battery in the case that the power grid is at a valley period electricity price and residual energy exists in the energy generation system, can control the power grid to charge the first battery and control the first battery to be discharged to the second battery in the case that the power grid is at the valley period electricity price and residual output energy exists in the energy generation system and can control the energy generation system to charge the first battery and control the first battery to be discharged to the second battery in the case that the power grid is at a peak-valley electricity price and residual output energy exists in the energy generation system.

According to the battery heating control scheme provided in the embodiment of the present application, when connected to the power grid and/or the energy generation system, the battery heating system can control the power grid and/or the energy generation system to charge the first battery and control the first battery to be discharged to the second battery to heat the first battery and charging the second battery simultaneously, economic factors of battery charging and battery heating are considered, energy for battery heating can be saved, and the battery heating efficiency can be improved. On the other hand, according to the battery heating control scheme, there is little need to add an additional heating assembly and the like to the battery, and thus the battery heating cost can be reduced.

Figure 6:
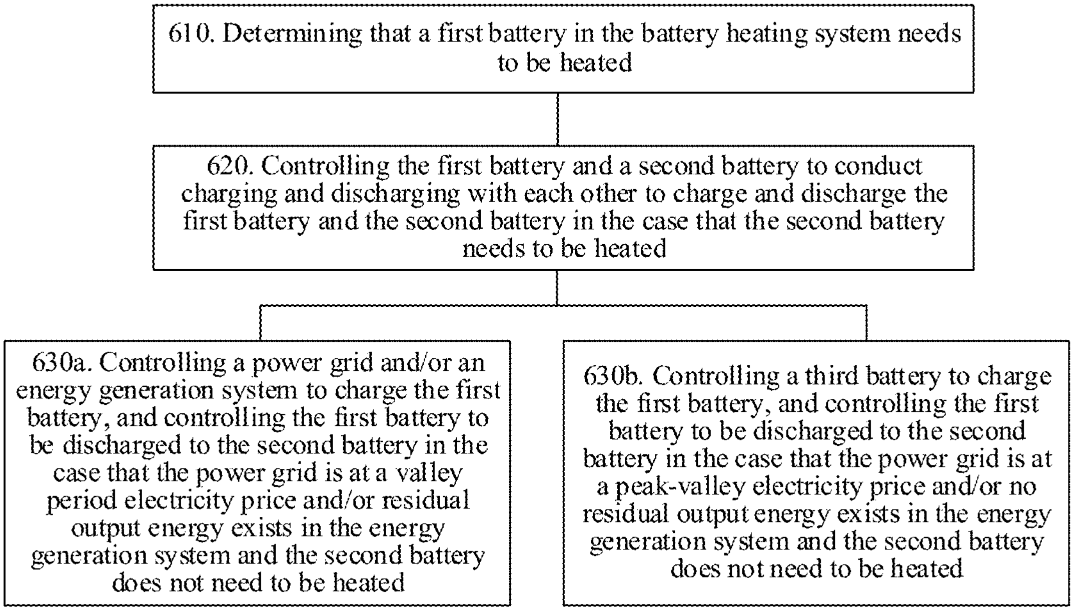
FIG. 6 is another schematic flow diagram of the battery heating control method provided according to the embodiment of the present application.

FIG. 6 is a schematic flow diagram of the battery heating control method provided according to the embodiment of the present application. The battery heating control method is applicable to a battery heating system including a plurality of batteries connected with each other. Optionally, the battery heating system can be connected to the power grid and/or the energy generation system. Optionally, the battery heating system may further include a dischargeable third battery. The battery heating control method may include a portion of or all of the following content.

At operation 610, the method includes to determine that a first battery in the battery heating system needs to be heated.

At operation 620, the method includes to control the first battery and the second battery to conduct charging and discharging with each other to conduct charging and discharging on the first battery and the second battery in the case that the second battery needs to be heated.

The descriptions in operation 610 and operation 620 can refer to the related descriptions in operation 210 and operation 320, which will not be described here according to the present application.

At operation 620*a*, the method includes to control the power grid and/or the energy generation system to charge the first battery and control the first battery to be discharged to the second battery in the case that a dischargeable third battery exists in the battery heating system, the power grid is at a valley period electricity price and/or residual output energy exists in the energy generation system and the second battery does not need to be heated.

In an embodiment of the present application, the battery heating system can be only connected to the power grid and can control the power grid to charge the first battery and control the first battery to be discharged to the second battery in the case that the power grid is at the valley period electricity price.

In an embodiment of the present application, the battery heating system can be only connected to the energy generation system and controls the energy generation system to charge the first battery and control the first battery to be discharge to the second battery in the case that residual output energy exists in the energy generation system, such as residual output energy left after the energy generation system outputs energy to the power grid and the like.

In an embodiment of the present application, the battery heating system can be connected to the power grid and the energy generation system, can control the power grid and the energy generation system to charge the first battery in the case that the power grid is at a valley period electricity price and residual energy exists in the energy generation system, can control the power grid to charge the first battery when the power grid is at the valley period electricity price and no residual output energy exists in the energy generation system and can control the energy generation system to charge the first battery and control the first battery to be discharged to the second battery when the power grid is at a peak-valley electricity price and residual output energy exists in the energy generation system.

According to the battery heating control scheme provided according to the embodiment of the present application, in the case that the power grid is at a valley period electricity price and/or residual energy exists in the energy generation system, the power grid and/or the energy generation system is controlled to charge the first battery, economic factors of battery heating are considered, energy for battery heating can be saved, and the battery heating cost can be reduced. On the other hand, the number of charging and discharging cycles of the third battery can be reduced, the performance of the third battery can be improved, and the service life of the third battery can be prolonged.

At operation 630*b*, the method includes to control a dischargeable third battery to charge the first battery and control the first battery to be discharged to the second battery in the case that the dischargeable third battery exists in the battery heating system, the power grid is at a peak-valley electricity price and/or no residual output energy exists in the energy generation system and the second battery does not need to be heated.

In an embodiment of the present application, the battery heating system can be only connected to a power grid and can control the third battery to charge the first battery and control the first battery to be discharged to the second battery in the case that the power grid is at a peak-valley electricity price and the second battery does not need to be heated.

In an embodiment of the present application, the battery heating system can be only connected to an energy generation system and can control the third battery to charge the first battery and control the first battery to be discharged to the second battery in the case that no residual energy exists in the energy generation system.

In an embodiment of the present application, the battery heating system can be connected to the power grid and the energy generation system and can control the third battery to charge the first battery and control the first battery to be discharged to the second battery in the case that the power grid is at a peak-valley electricity price and no residual energy exists in the energy generation system.

According to the battery heating control scheme provided in the embodiment of the present application, in the case that the power grid is at a peak-valley electricity price and/or no residual output energy exists in the energy generation system and the second battery does not need to be heated, the third battery can be controlled to charge the first battery, the first battery is controlled to be discharged to the second battery, economic factors of battery heating are considered, energy for battery heating can be saved, and the battery heating cost can be reduced.

In an embodiment of the present application, the first battery is a traction battery or an energy storage battery, and the second battery is a traction battery or an energy storage battery.

In an embodiment, the first battery and the second battery may be batteries in an energy storage charging system such as an energy storage charging station.

According to the battery heating control scheme provided in the embodiment of the present application, batteries to be heated can be heated by heat generated during the process of charging and discharging of the batteries in the energy storage charging station, economic factors are considered in the process of heating the batteries, energy for battery heating is saved, the battery heating cost is reduced, and the yield of the energy storage charging station is increased.

In an embodiment of the present application, both the first battery and the second battery are traction batteries, and the third battery is an energy storage battery.

According to the battery heating control scheme provided according to the embodiment of the present application, a first traction battery (first battery) can be heated and a second traction battery (second battery) can be charged simultaneously by charging the first traction battery by the energy storage battery and discharging the first traction battery to the second traction battery, energy for battery heating can be saved, and the battery heating efficiency can be improved. On the other hand, the energy storage battery can be controlled to charge the first traction battery only when the power grid is at a peak-valley electricity price and/or no residual energy exists in the energy generation system, economic factors are considered, power consumption for battery heating can be reduced, the number of charging and discharging cycles of the energy storage battery can be reduced, the performance of the energy storage battery can be improved, and the service life of the energy storage battery can be prolonged.

In an embodiment of the present application, the number of the first battery, the second battery or the third battery may be one or more. Either one battery charges one battery, or one battery charges multiple batteries, even multiple batteries charge multiple batteries. Similarly, the power grid and/or the energy generation system can charge either one battery or multiple batteries.

Take a battery in an energy storage charging system (such as an energy storage charging station) as an example, the charging and discharging situation of the first battery during the process of heating the first battery is exemplarily introduced in several different situations. For the convenience of description and understanding, suppose that an energy storage charging system is only connected to a power grid.

As an example, in the situation that an energy storage battery of the energy storage charging system needs to be heated and a traction battery in the energy storage charging system such as a traction battery of an electric vehicle needs to be charged, the power grid can be controlled to charge the energy storage battery, and the energy storage battery can be controlled to be discharged to the traction battery.

As an example, in the situation that both the energy storage battery and the traction battery of the energy storage charging system need to be heated, batteries in the energy storage charging system can be controlled to conduct charging and discharging with each other. For example, the energy storage battery can be controlled to charge traction batteries, and then the traction batteries can be controlled to be discharged to the energy storage battery; or the energy storage battery and one part of the traction batteries can be controlled to charge another part of the traction batteries, and then another part of the traction batteries are controlled to be discharged to the energy storage battery and the one part of the traction batteries.

As an example, in the situation that the traction batteries in the energy storage charging system all need to be heated, one part of the traction batteries and another part of the traction batteries can be controlled to conduct charging and discharging with each other, where the number of one part of the traction batteries may be equal to or not equal to that of another part of the traction batteries. One part of the traction batteries and another part of the traction batteries can be controlled to conduct charging and discharging with each other and the remaining part of the traction batteries and the energy storage battery can be controlled to conduct charging and discharging with each other in the case that the power grid is at a peak-valley electricity price or the SOC of the energy storage battery is equal to $SOC_{max}$; or the traction batteries and the energy storage battery can be controlled to conduct charging and discharging with each other. In the case that the power grid is at a valley period electricity price and the SOC of the energy storage battery is less than $SOC_{max}$, one part of the traction batteries and another part of the traction batteries can be controlled to conduct charging and discharging with each other, the power grid can be controlled to charge the remaining part of the traction batteries, and the remaining part of the traction batteries can be controlled to be discharged to the energy storage battery; or the power grid can be controlled to charge the traction batteries, and the traction batteries can be controlled to be discharged to the energy storage battery.

As an example, in the situation that an energy storage battery and part of the traction batteries in the energy storage charging system need to be heated and part of the traction batteries in the energy storage charging system need to be charged, the power grid can be controlled to charge the energy storage battery that needs to be heated and the traction batteries that need to be heated, and the energy storage battery that needs to be heated and the traction batteries that need to be heated can be controlled to be discharged to the traction batteries that need to be charged. The energy storage battery that needs to be heated and traction batteries that need to be heated can also be controlled to conduct charging and discharging with each other, and then the traction batteries that need to be charged are charged after heating is completed.

As an example, in the situation that part of the traction batteries in the energy storage charging system need to be heated and part of the traction batteries need to be charged, the power grid can be controlled to charge the traction batteries that need to be heated and the traction batteries that need to be heated can be controlled to be discharged to the traction batteries that need to be charged in the case that the power grid is at a valley period electricity price.

It should be understood that in the embodiments of the present application, the serial numbers of the above-mentioned processes do not mean the execution sequence, and the execution sequence of the processes should be determined by its function and internal logic, and should not constitute any limitation on the implementation processes of the embodiments of the present application.

The battery heating control method in the embodiment of the present application has been described in detail above, and the control device will be described in detail below in conjunction with FIG. 7 and FIG. 8 according to the embodiment of the present application. The technical features described according to the method embodiments are suitable for device embodiments below.

Figure 7:
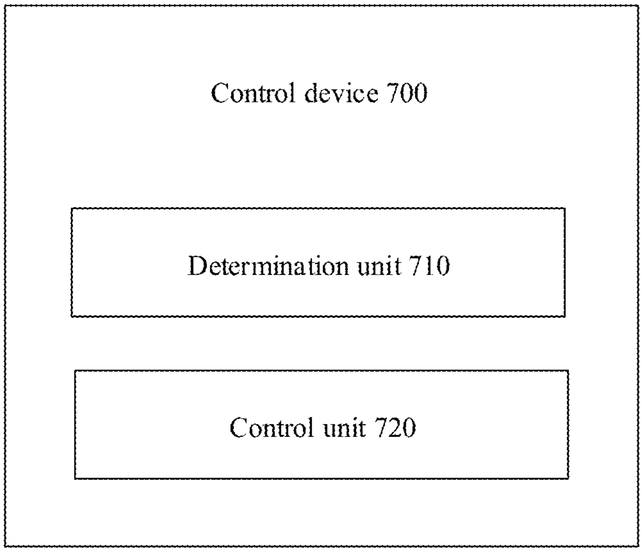
FIG. 7 is a schematic block diagram of a battery heating control device according to the embodiment of the present application.

FIG. 7 is a schematic block diagram of a control device 700 according to the embodiment of the present application, The control device is applicable to a battery heating system including a plurality of batteries connected with each other. As shown in FIG. 7, the control device may include a portion or all of the following content:

- a determination unit 710, configured to determine that a first battery in the battery heating system needs to be heated; and
- a control unit 720, configured to control the first battery to conduct charging and discharging to heat the first battery, wherein the first battery is discharged to a second battery in the battery heating system.

In an embodiment of the present application, the control unit is configured to control the first battery and the second battery to conduct charging and discharging with each other to heat the first battery and the second battery in the case that the second battery needs to be heated.

In an embodiment of the present application, the control unit is configured to control a dischargeable third battery to charge the first battery in the case that the dischargeable third battery exists in the battery heating system and the second battery does not need to be heated.

In an embodiment of the present application, the battery heating system is connected to a power grid and/or an energy generation system, and the control unit is configured to control the power grid and/or the energy generation system to charge the first battery in the case that the second battery does not need to be heated.

In an embodiment of the present application, the control unit is configured to control the power grid and/or the energy generation system to charge the first battery in the case that the power grid is at a valley period electricity price and/or residual output energy exists in the energy generation system.

In an embodiment of the present application, the power grid and/or the energy generation system is controlled to charge the first battery in the case that a dischargeable third battery exists in the battery heating system, the power grid is at a valley period electricity price and/or residual output energy exists in the energy generation system and the second battery does not need to be heated.

In an embodiment of the present application, the battery heating system is connected to the power grid and/or the energy generation system, and the control unit is configured to control a dischargeable third battery to charge the first battery in the case that the dischargeable third battery exists in the battery heating system, the power grid is at a peak-valley electricity price and/or no residual output energy exists in the energy generation system.

In an embodiment of the present application, the first battery is a traction battery or an energy storage battery, and the second battery is a traction battery or an energy storage battery.

In an embodiment of the present application, both the first battery and the second battery are traction batteries, and the third battery is an energy storage battery.

It should be understood that the above and other operations and/or functions of the modules in the battery heating control device 700 are for implementations of corresponding processes in the methods in FIG. 2 to FIG. 6, and for brevity, it is not described again here.

In an embodiment of the present application further provides a battery heating system including a plurality of batteries connected with each other and the control device 700 provided according to the embodiments above.

Figure 8:
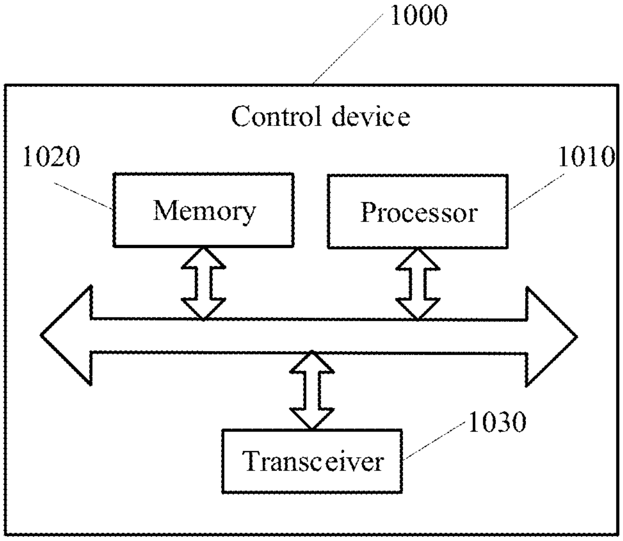
FIG. 8 is another schematic block diagram of the battery heating control device according to the embodiment of the present application.

FIG. 8 is a schematic block diagram of a control device 1000 of an energy storage system according to the embodiment of the present application, As shown in FIG. 8, the control device 1000 includes a processor 1010 and a memory 1020, wherein the memory 1020 is configured to store instructions, and the processor 1010 is configured to read the instructions and perform the foregoing methods in the embodiments of the present application based on the instructions, wherein the memory 1020 may be an individual device independent of the processor 1010 and may also be integrated into the processor 1010.

In an embodiment, as shown in FIG. 8, the control device 1000 of the energy storage system may also include a transceiver 1030. The processor 1010 may control the transceiver 1030 to communicate with other devices. Specifically, the transceiver can send information or data to other devices, or receive information or data sent by other devices.

It should be understood that the processor may be an integrated circuit chip and has a signal processing capability according to the embodiment of the present application. During the implementing process, the steps according to the method embodiments above may be completed through an integrated logic circuit of hardware in the processor or instructions in the form of software. The above-mentioned processor may be a general-purpose processor, a digital signal processor (DSP), an application specific integrated circuit (ASIC), a field programmable gate array (FPGA) or other programmable logic devices, discrete or transistor logic devices and discrete hardware components. The processor may implement or execute the methods, steps and logic block diagrams disclosed according to the embodiments of the present application. The general-purpose processor may be a microprocessor or may also be any conventional processor, and so on. The steps of the method disclosed in conjunction with the embodiments of the present application may be embodied directly in a hardware decoding processor to be executed and completed or in a combination of hardware and software modules in the decoding processor to be executed and completed. The software modules may be located in a mature storage medium of the field, such as RAM, flash memory, ROM, a programmable ROM or an electrically erasable programmable memory and a register. The storage medium is located in the memory and the processor reads information in the memory and is in conjunction with hardware thereof to complete the steps of the methods.

It should be understood that the memory may be a volatile memory or a non-volatile memory, or may include both the volatile memory and the non-volatile memory according to the embodiments of the present application. The non-volatile memory may be a read-only memory (ROM), a programmable ROM (PROM), an erasable PROM (EPROM), an electrically EPROM (EEPROM) or a flash memory. The volatile memory may be a random-access memory (RAM) and serves as an external cache. Through illustrative but not limiting explanations, many forms of RAMs are available, such as a static RAM (SRAM), a dynamic RAM (DRAM), a synchronous DRAM (SDRAM), a double-data-rate SDRAM (DDR SDRAM), an enhanced SDRAM (ESDRAM), a synchlink DRAM (SLDRAM) and a direct rambus RAM (DR RAM). It should be noted that the memory of the system and methods described herein is intended to include but is not limited to these and any other suitable types of memories.

The embodiment of the present application further provides a computer-readable storage medium for storing a computer program.

In an embodiment, the computer-readable storage medium may be applied to the control device of the energy storage system control device according to the embodiment of the present application. The computer program is run on a computer to enable the computer to perform corresponding flows implemented by the control device in the methods according to the embodiments of the present application, and for brevity, it is not described here.

The embodiment of the present application further provides a computer program product which includes computer program instructions.

In an embodiment, the computer program product can be applied to the battery heating control device according to the embodiment of the present application. The computer program instructions are run on a computer to enable the computer to perform corresponding flows implemented by the battery heating control device in the methods according to the embodiments of the present application, and for brevity, it is not described here.

The embodiment of the present application further provides a computer program.

In an embodiment, the computer program can be applied to the battery heating control device according to the embodiment of the present application. The computer program is run on a computer to enable the computer to perform corresponding flows implemented by the battery heating control device in the methods according to the embodiments of the present application, and for brevity, it is not described here.

Those of ordinary skill in the art may be aware that units, algorithms and steps in the examples described in conjunction with the embodiments disclosed herein can be realized through electronic hardware or a combination of computer software and electronic hardware. Whether these functions are performed in the form of hardware or software depends on specific application and design constraint conditions of the technical scheme. Skilled artisans may implement the described functions of each specific application in different ways, but such implementation should not be interpreted as a departure from the scope of the present application.

Those skilled in the art can clearly understand that, for the convenience and brevity of description, the specific working process of the system, devices and units described above may refer to the corresponding process in the foregoing method embodiments, which will not be repeated here.

In the several embodiments provided in the present application, it should be understood that the disclosed system, devices and methods may be implemented in other manners. For example, the device embodiments described above are only illustrative. For example, the division of units is only a logical function division. In actual implementation, there may be other division methods. For example, multiple units or components may be combined or integrated into another system, or some features may be omitted, or not implemented. In addition, involved mutual coupling or direct coupling or communication connection may be indirect coupling or communication connection through some interfaces, devices or units or in electrical, mechanical or other forms according to the embodiments of the present application.

The units described as separate components may or may not be physically separated, and the components displayed as units may or may not be physical units, i.e., they may be located in one place, or they may be distributed on multiple network units. Some or all of the units may be selected according to actual needs to achieve the purposes of the schemes of the embodiments.

In addition, the functional units in the various embodiments of the present application may be integrated into one processing unit, or each unit may exist alone physically, or two or more units may be integrated into one unit.

The functions, if implemented in the form of software functional units and sold or used as separate products, may be stored in a computer-readable storage medium. Based on such understanding, the technical solution of the present application, which is essential or contributes to the prior art, or a part of the technical solution, may be embodied in the form of a computer software product, which is stored in a storage medium, including a plurality of instructions used to enable a computer device (which may be a personal computer, a server, or a network device, etc.) to perform all or part of the steps of the methods described in the embodiments of the present application. The foregoing storage medium includes various mediums capable of storing program codes, such as a U disk, a mobile hard disk, a ROM, a RAM, a magnetic disk or an optical disk.

Although the present application has been described with reference to preferred embodiments, various improvements can be made thereto and equivalents can be used for the replacement of members therein without departing from the scope of the present application. Most of all, on the premise of no structural conflict, the technical features mentioned in the embodiments can be combined in any way. The present application is not restricted to particular embodiments disclosed herein but comprises all the technical solutions falling in the scope of the claims.

What is claimed is:

1. A battery heating control method comprising:

determining that a first battery in a battery heating system needs to be heated, the battery heating system being connected to a power grid or an energy generation system or both and comprising a plurality of batteries connected with each other, the plurality of batteries comprising the first battery; and controlling the first battery to conduct charging and discharging to heat the first battery, wherein the controlling the first battery to conduct charging and discharging further comprises:

discharging the first battery to a second battery in the battery heating system in response to when the second battery needs to be charged;

controlling the first battery and the second battery to conduct charging and discharging with each other to heat the first battery and the second battery in response to when the second battery needs to be heated;

controlling the power grid or the energy generation system or both to charge the first battery in response to when the second battery does not need to be heated;

controlling a dischargeable third battery to charge the first battery in response to one or more of the following conditions: the third battery is present in the battery heating system, the power grid is at a peak-valley electricity price, or no residual output energy is present in the energy generation system and the second battery does not need to be heated; and controlling the third battery to charge the first battery and controlling the first battery to be discharged to the second battery, in response to when the third battery is present in the battery heating system and the second battery does not need to be heated, wherein heating the first battery and charging the second battery are implemented simultaneously through charging the first battery by the third battery and discharging the first battery to the second battery.

2. The control method according to claim 1, wherein the controlling the power grid or the energy generation system or both to charge the first battery comprises:

controlling the power grid or the energy generation system or both to charge the first battery in response to when the power grid is at a valley period electricity price or residual output energy is present in the energy generation system or both.

3. The control method according to claim 1, wherein the controlling the power grid or the energy generation system or both to charge the first battery comprises:

controlling the power grid or the energy generation system or both to charge the first battery in response to one or more of the following conditions: the third battery is present in the battery heating system, the power grid is at a valley period electricity price, or residual output energy is present in the energy generation system and the second battery does not need to be heated.

4. The control method according to claim 1, wherein the first battery is a traction battery or an energy storage battery, and the second battery is a traction battery or an energy storage battery.

5. The control method according to claim 1, wherein both the first battery and the second battery are traction batteries, and the third battery is an energy storage battery.

6. The control method according to claim 1, further comprising:

determining whether the second battery needs to be charged, wherein when a state of charge (SOC) of the second battery is less than or equal to a threshold SOC value and a temperature of the second battery is greater than or equal to a preset temperature, the second battery needs to be charged.

7. A control device configured to perform the following operations:

determining that a first battery in a battery heating system needs to be heated, the battery heating system being connected to a power grid or an energy generation system or both and comprising a plurality of batteries connected with each other; and controlling the first battery to conduct charging and discharging to heat the first battery, wherein the controlling the first battery to conduct charging and discharging to heat the first battery further comprises:

discharging the first battery to a second battery in the battery heating system in response to when the second battery needs to be charged, controlling the first battery and the second battery to conduct charging and discharging with each other to heat the first battery and the second battery in response to when the second battery needs to be heated;

controlling the power grid or the energy generation system or both, to charge the first battery in response to when the second battery does not need to be heated, controlling a dischargeable third battery to charge the first battery in response to one or more of the following conditions: the third battery is present in the battery heating system, the power grid is at a peak-valley electricity price, or no residual output energy is present in the energy generation system and the second battery does not need to be heated; and controlling the third battery to charge the first battery and controlling the first battery to be discharged to the second battery, in response to when the third battery is present in the battery heating system and the second battery does not need to be heated, wherein heating the first battery and charging the second battery are implemented simultaneously through charging the first battery by the third battery and discharging the first battery to the second battery.

8. The control device according to claim 7, wherein the operations further comprise:

controlling the power grid or the energy generation system or both to charge the first battery in response to when the power grid is at a valley period electricity price or residual output energy is present in the energy generation system or both.

9. The control device according to claim 7, wherein the operations further comprise:

controlling the power grid or the energy generation system or both, to charge the first battery in response to when the third battery is present in the battery heating system, the power grid is at a valley period electricity price or residual output energy is present in the energy generation system and the second battery does not need to be heated, or both.

10. The control device according to claim 7, wherein the first battery is a traction battery or an energy storage battery, and the second battery is a traction battery or an energy storage battery.

11. The control device according to claim 7, wherein both the first battery and the second battery are traction batteries, and the third battery is an energy storage battery.

12. A battery heating system, comprising the plurality of batteries connected with each other and the control device, according to claim 7, wherein the control device and the plurality of batteries are communicatively coupled.

13. The control device according to claim 7, wherein the operations further comprise:

determining whether the second battery needs to be charged, wherein when a state of charge (SOC) of the second battery is less than or equal to a threshold SOC value and a temperature of the second battery is greater than or equal to a preset temperature, the second battery needs to be charged.

14. A non-transitory computer readable memory storing instructions that, when executed by a processor, cause processor to perform the following operations:

determining that a first battery in a battery heating system needs to be heated, the battery heating system being connected to a power grid or an energy generation system or both and comprising a plurality of batteries connected with each other; and controlling the first battery to conduct charging and discharging to heat the first battery, wherein the controlling the first battery to conduct charging and discharging to heat the first battery further comprises:

discharging the first battery to a second battery in the battery heating system in response to when the second battery needs to be charged, controlling the first battery and the second battery to conduct charging and discharging with each other to heat the first battery and the second battery in response to when the second battery needs to be heated;

controlling the power grid or the energy generation system or both, to charge the first battery in response to when the second battery does not need to be heated, controlling a dischargeable third battery to charge the first battery in response to one or more of the following conditions: the third battery is present in the battery heating system, the power grid is at a peak-valley electricity price, or no residual output energy is present in the energy generation system and the second battery does not need to be heated; and controlling the third battery to charge the first battery and controlling the first battery to be discharged to the second battery, in response to when the third battery is present in the battery heating system and the second battery does not need to be heated, wherein heating the first battery and charging the second battery are implemented simultaneously through charging the first battery by the third battery and discharging the first battery to the second battery.

* * * * *